3,746,714
METHODS FOR INHIBITING AGGRESSIVE BE-
HAVIOR BY MEANS OF s-TRIAZOLO-[3,4-a]-
ISOQUINOLINES
Morton E. Goldberg, Glen Rock, N.J., assignor to
Mallinckrodt Chemical Works, St. Louis, Mo.
No Drawing. Filed Oct. 6, 1971, Ser. No. 187,175
Int. Cl. A61u 27/00
U.S. Cl. 424—258    5 Claims

ABSTRACT OF THE DISCLOSURE

Certain s-triazolo-[3,4-a]-isoquinoline compounds are shown to exhibit anti-agressive activity. The 8,9-dimethoxy and 3-methyl-8,9-dimethoxy derivatives are preferred.

BACKGROUND OF THE INVENTION

The present invention relates to the pharmaceutical field, and more particularly to methods and pharmaceutical compositions for treating mammals utilizing as active agents certain organic heterocyclic compounds from the class known as s-triazolo-[3,4-a]-isoquinolines.

The preparation of various s-triazolo-[3,4-a]-isoquinolines is disclosed by (1) S. Naqui et al., Indian J. Chem., 3, 162-4 (1965); (2) G. S. Sidhu et al., Jour. Heterocyclic Chem., 3, 158-164 (1966); (3) J. E. Francis, U.S. Pat. 3,354,164 (1967); (4) H. K. Reimlinger et al., French Pat. 1,573,135 (1969) and (5) H. K. Reimlinger et al., Chem. Ber. 103, 1960-1981 (1970).

No pharmaceutical compositions or utility are disclosed in preferences (1), (2), (4) and (5) cited above. Francis (3) discloses that unsubstituted s-triazolo-[3,4-a]-isoquinoline and its 3-lower alkyl derivatives are coronary vasodilators.

The invention is particularly concerned with the use of certain compounds for selectively inhibiting aggressive behavior in mammals.

It is known that certain compounds exhibit a type of central nervous system activity characterized as anti-aggressive activity. For example, it has been previously reported that benzquinamide, a central nervous system depressant (Merck Index, Eight ed., p. 136), and tetrabenazine, an antipsychotic agent (Merck Index, Eighth ed., p. 1022) possess some degree of antiaggressive activity.

It has been confirmed that lesions in the septal region of the forebrain in rats produces a striking increase in emotional behavior. Brady et al., J. Comp. Physiol. psychol. 46, 339 (1953) and Brady et al., J. Comp. Physiol. Psychol. 48, 412 (1955). This is accompanied by violent attack behavior in response to previously neutral stimuli ("septal rats"). The effects of depressant compounds on this type of aggressive behavior have been reported, e.g., Hunt, N.Y. Acad. Sci., 67, 712 (1957), Randall et al., J. Pharmacol. exp. Ther. 129, 163 (1960) and Malick et al., Arch. int. Pharmacodyn. 181, 459 (1969). In addition, it has been shown (Karli, C. R. Soc. Biol. 149, 2227 (1955) and Karli, Behaviour, 10, 81 (1956) that certain rats will readily attack and kill mice upon presentation ("killer rats"). Here again, it has been demonstrated that certain antidepressants, stimulants and antihistaminics selectively inhibit the muricidal (mouse killing) response in these rats (Horovitz et al., Life Sci. 4, 1909 (1965) and Horovitz et al., Int. J. Neuropharmacol. 5, 405 (1966). So-called "septal rats" and "killer rats" procedures have thus been established to determine the inhibitory effect of test compounds on aggressive behavior (cf. Goldberg, Arch. int. Pharmacodyn., 186, 287 (1970).

SUMMARY OF THE INVENTION

Among the several objects of the invention may be noted the provision of pharmaceutical compositions and methods for inhibiting aggressive behavior in a susceptible mammal, which compositions and methods utilize certain known s-triazolo-[3,4-a]-isoquinolines as active agents; and the provision of such compositions which are adapted for either oral or parenteral administration to such susceptible mammals. Other objects and features of the invention will be in part apparent and in part pointed out hereinafter.

The present invention is thus directed to a method of inhibiting aggressive behavior in a susceptible mammal by administering to said mammal an effective amount of an s-triazolo-[3,4-a]-isoquinoline compound from the group hereinafter specifically set forth and to pharmaceutical compositions comprising such a compound and a pharmaceutical carrier.

DESCRIPTION OF THE PREFERRED EMBODIMENTS

In accordance with the present invention, it has now been found that certain s-triazolo-[3,4-a]-isoquinoline compounds exhibit anti-aggressive activity. The type and degree of anti-aggressive activity observed with s-triazolo-[3,4-a]-isoquinoline compounds is selective in nature and the presence or absence of such activity, and its degree when present, appears to be quite sensitive to the position and type of substitution on the basic s-triazolo[3,4-a]-isoquinoline structure.

The specific s-triazolo-[3,4-a]-isoquinoline compounds which have been found to possess anti-aggressive activity are:

8,9-dimethoxy-s-triazolo-[3,4-a]-isoquinoline
3-methyl-8,9-dimethoxy-s-triazolo-[3,4-a]isoquinoline
3-ethyl-8,9-dimethoxy-s-triazolo-[3,4-a]-isoquinoline
3-isopropyl-8,9-dimethoxy-s-triazolo-[3,4-a]-isoquinoline
3,5-dimethyl-s-triazolo-[3,4-a]-isoquinoline
5-methyl-s-triazolo-[3,4-a]-isoquinoline
3-(N-pyrrolidylmethyl)-s-triazolo-[3,4-a]-isoquinoline
3-trifluoromethyl-6-chloro-s-triazolo-[3,4-a]-isoquinoline
7-amino-s-triazolo-[3,4-a]-isoquinoline As brought out hereinafter, the compounds 8,9-dimethoxy-s-triazolo-[3,4-a]-isoquinoline and 3-methyl-8,9-dimethoxy-s-triazolo-[3,4-a]-isoquinoline have both been shown to specifically inhibit the aggressive response in mouse-killing and septal-lesioned rats at doses below those which produced evidence of neurotoxicity.

In further accordance with the invention, pharmaceutical compositions and methods useful in inhibiting aggressive behavior in susceptible mammals are provided, the compositions comprising an aforementioned s-triazolo-[3,4-a]-isoquinoline compound and a pharmaceutical carrier which may be either liquid or solid material. These compositions may be administered orally or parenterally in the usual pharmaceutical forms including capsules, tablets, solutions, suspensions and the like. For example, the s-triazolo-[3,4-a]-isoquinoline compound may be formulated with carriers such as magnesium stearate and lactose and filled into gelatin capsules. Examples of other solid pharmaceutical carriers, such as fillers, binders and lubricants, include dibasic calcium phosphate, calcium sulfate dihydrate, microcrystalline cellulose, calcium carbonate and talc. The pharmaceutical compositions of the invention may also be in the form of sterile parenteral solutions with the s-triazolo-[3,4-a]-isoquinoline compound dissolved in a sterile parenteral solvent such as polyethylene glycol, propylene glycol, water or mixtures of solvents or the compositions may be in the form of suspensions.

Where the s-triazolo-[3,4-a]-isoquinoline compound is water-insoluble, it is preferred that the compound be formulated into the pharmaceutical compositions of the invention in a micronized form, as by milling the compound by conventional methods. More particularly, it is preferred that the compound be micronized to a particle size of approximately 1–10 microns.

The following examples illustrate the invention:

In the following animal studies, male hooded rats of the Long-Evans strain, weighing between 200 and 300 grams, and male albino mice, weighing approximately 20 grams, were used as subjects. They were permitted food and water ad libitum except during drug studies and during the period in which killer rats were selected.

EXAMPLE 1

The anti-aggressive activity of representative compounds of the invention was determined using the following "septal rats" test procedure.

Bilateral electrolytic lesioning, utilizing anodal DC current, of the septal area was performed under pentobarbital anesthesia. The animals were stereotaxically lesioned, using a slight modification of the method of Stark and Henderson (Int. H. Neuropharmacol., 5, 385 (1966)), in which a current intensity of 7 milliamperes was delivered for 15 seconds to each septal region. All animals were given penicillin prophylactically, and were initially tested 3 to 6 days after lesioning. The Konig and Klippel atlas (cf. The Rat Brain, Williams & Wilkins Co., Baltimore, Md., 1963) was utilized for histological verification of lesion sites in selected animals. A scoring system was used which measured only the "aggressiveness" component of the septal syndrome. The animals were tail restrained and evaluated before and 60 minutes after the intraperitoneal injection (i.p.) or oral administration of the compounds tested. Two inanimate objects, a pencil and a glove, were offered and reactions were graded as: 0—indifference to either stimulus, 1—nibbling of one or both objects, 2—voracious attack of 1 object, 3—voracious attack of both objects. Only rats which exhibited a score of 3 prior to injection of a test compound were used, and animals which showed a 0 or 1 score at retest (60 minutes post injection) were considered blocked. The $ED_{50}$ value was obtained for each compound tested and is defined as that dose which results in a score of 0 or 1 in 50% of the animals tested. The following results were obtained:

TABLE 1

| Compound | Mode of administration | Anti-aggressive activity ($ED_{50}$ mg./kg.) |
|---|---|---|
| 3-ethyl-8,9-dimethoxy-s-triazolo-[3,4-a]-isoquinoline. | I.P. | 6.8 |
| 3-(N-pyrrolidylmethyl)-s-triazolo-[3,4-a]-isoquinoline. | I.P. | 4 |
|  | Oral | 16.5 |
| 3,5-dimethyl-s-triazolo-[3,4-a]-isoquinoline | I.P. | [1] 25 |
| 5-methyl-s-triazolo-[3,4-a]-isoquinoline | I.P. | 4.5 |
|  | Oral | 10.9 |
| 7-amino-s-triazolo-[3,4-a]-isoquinoline | I.P. | [1] 25 |

[1] Approximately.

EXAMPLE 2

The anti-aggressive activity of 3-ethyl-8,9-dimethoxy-s-triazolo-[3,4-a]-isoquinoline, 3,5 - dimethyl-s-triazolo-[3,4-a]-isoquinoline and 5-methyl-s-triazolo-[3,4-a]-isoquinoline was determined using the following "killer rats" test procedure.

The animals were housed individually for approximately 6 weeks and maintained on a restricted food intake of 15 grams per day of solid food and water ad libitum. After isolation, the rats were tested for their mouse-killing response and only those animals which killed mice within 2 minutes after presentation on 3 consecutive days were used. The selected animals were tested twice prior to treatment and at 30, 60, 120, 180 and 240 minutes after intraperitoneal injection of the test compound. The $ED_{50}$ was obtained and is defined as that dose which blocks attacks in 50% of the animals tested.

The $ED_{50}$ values for 3-ethyl-8,9-dimethoxy-s-triazolo-[3,4-a]-isoquinoline, 3,5 - dimethyl-s-triazolo-[3,4-a]-isoquinoline and 5 - methyl-s-triazolo[3,4-a] - isoquinoline were found to be 17 mg./kg., 34.5 mg./kg. and 22.8 mg./kg., respectively.

EXAMPLE 3

The anti-aggressive activity of 8,9-dimethoxy-s-triazolo-[3,4-a]-isoquinoline and 3-methyl-8,9-dimethoxy-s - triazolo-[3,4-a]-isoquinoline was compared with that of chlorpromazine, chlordiazepoxide, imipramine, tetrabenazine and benzquinamide. Chlorpromazine, chlordiazepoxide and imipramine were used as hydrochloride salts and tetrabenazine was used as the methanesulfonate salt. The other compounds were used as bases.

The compounds were dissolved or finely suspended in 0.5% methylcellulose solution just prior to use and concentrations varied as to administer them in a constant volume proportional to the weight of the animal. The doses reported below refer to the amount of base or to the amount of salt given when used in that form.

The compounds were tested using the "septal rats" and "killer rats" procedures of Examples 1 and 2. In the killer rats test procedure, the selected animals were tested twice prior to treatment and at 30 and 60 minutes after intraperitoneal injection of the test compound. The compounds were administered by intraperitoneal injection in each test.

The compounds were also tested in accordance with the following neurotoxicity or rotarod performance test procedure. Rats were trained to maintain themselves on a slowly revolving wooden rod (5 rev./min.) according to the method of Dunham and Miya, J. Amer. Pharm. Assoc. (Sci. ed.) 46, 208 (1957). They were tested prior to and at 15, 30 and 60 minutes after administration of the test compounds. Neurotoxicity was considered when the animals fell from the rotarod more than once during a one minute period. Mean neurotoxic doses ($NTD_{50}$) were calculated at the post-drug period which yielded maximal responses.

The results are set forth in the following table.

TABLE 2

| Compound | Rotarod performance, $NTD_{50}$ (95% C.L.) mg./kg. | Killer rats test, $ED_{50}$ (95% C.L.) mg./kg. | $\dfrac{NTD_{50}}{ED_{50}}$ | Septal rats test, $ED_{50}$ (95% C.L.) mg./kg. | $\dfrac{NTD_{50}}{ED_{50}}$ |
|---|---|---|---|---|---|
| Tetrabenazine | 1.5(1.0–2.1) (24) | 55.5(41.0–75.0) (25) | .03 | 1/6 at 30.0 (18) | .05 |
| Chlorpromazine | 1.9(1.0–2.1) (24) | 5.6(2.6–12.3) (25) | .34 | 11.3(7.9–16.4) (21) | .17 |
| Benzquinamide | 6.8(4.3–10.7) (18) | 57.9(40.6–82.4) (18) | .12 | 26.4(14.6–47.9) (28) | .26 |
| Chlordiazepoxide | 7.3(4.2–12–8) (18) | 20.5(13.8–30.5) (20) | .36 | 23.0(14.4–36.8) (18) | .32 |
| 8,9-dimethoxy-s-triazolo-[3,4-a]-isoquinoline | 15.5(11.2–21.5) (18) | 12.6(9.6–16.5) (20) | 1.23 | 7.6(5.6–10.3) (20) | 2.04 |
| 3-methyl-8,9-dimethoxy-s-triazolo-[3,4-a]-isoquinoline | 21.0(16.9–26.0) (18) | 12.1(10.8–13.6) (50) | 1.74 | 5.4(2.9–10.1) (20) | 3.89 |
| Imipramine | 23.0(18.1–29.2) (24) | 13.4(6.7–26.8) (27) | 1.72 | 52.0(46.9–57.7) (20) | .44 |

NOTE.—Number in parenthesis following (95% C.L.) refers to number of animals studied.

The NTD$_{50}$/ED$_{50}$ ratios were obtained in order to examine the results for selectivity in accordance with the concept of Horovitz et al., Int. J. Neuropharmacol. 5, 405 (1966). Any ratio value greater than unity assumes selectivity for anti-aggressive activity compared with overt depression aond ataxia, as measured by the rotarod procedure. On this basis, 3-methyl-8,9-dimethoxy-s-triazolo-[3,4-a]-isoquinoline, 8,9-dimethoxy-s-triazolo-[3,4-a]-isoquinoline and imipramine were found to be active selectively in the killer rats procedure and only the two above-identified triazoloisoquinoline compounds were considered selective in taming septal rats. None of the other compounds studied yielded a ratio greater than one in either procedure.

Each of the compounds was also tested in accordance with the following discrete avoidance behavior procedure to permit another evaluation of overt depression. Using an automated pole-climb procedure (Aceto et al. Arch. Int. Pharmacodyn., 144, 214 (1963) and Johnson and Goldberg, J. Pharm. Pharmacol., 17, 55 (1965)), a modification of the method of Cook and Weidley (Ann. N.Y. Acad. Sci., 66, 740 (1957)) was used to study discrete avoidance behavior. Groups of 6 rats each were trained in individual boxes to consistently avoid foot-shock by jumping onto a Plexiglas pole. After training, performance criteria were established with solvent injections. In each experimental week, animals were given a control session and drug-treatment session on successive days. Each 2 hour behavioral session contained 240 discrete trials, each consisting of a 15 second intertrial interval (no stimulus), 10 seconds of buzzer, followed by 5 seconds of buzzer +shock (1 ma.). A response made at anytime while the buzzer was on terminated the trial. Reaction latencies, which were indicative of the animal's response (avoidance, escape, no response), were printed out for each trial and averaged for the session. Avoidance efficiencies for each animal and for each group were averaged. All animals used in these studies showed mean control response latencies between 4 to 7 seconds and successfully avoided shock in 92% or more of the trials. To obtain an estimate of the ID$_{50}$ (dose necessary to reduce response to 50% of control) and its 95% confidence limits (95% C.L.), a weighted linear regression analysis was used (Snedecor et al., Statistical Methods (Iowa State Coll. Press, Ames, Iowa, 1967)).

The results are set forth in the following table:

TABLE 3

| Compound | Discrete avoidance behavior, ID$^{50}$ (95% C.L.) mg./kg. |
|---|---|
| Tetrabenazine | 2.0 (1.6–2.3) (24) |
| Chlorpromazine | 3.1 (2.9–3.4) (18) |
| Benzquinamide | 4.9 (3.7–6.7) (24) |
| 8,9-dimethoxy-s-triazolo-[3,4-a]-isoquinoline | 6.2 (4.6–9.3) (24) |
| 3-methyl-8,9-dimethoxy-s-triazolo-[3,4-a]-isoquinoline | 17.4 (14.0–22.7) (24) |
| Chlordiazepoxide | 22.6 (21.9–23.3) (24) |
| Imipramine | 60.0 (18) |

Note.—Number in parenthesis following (95% C.L.) refers to number of animals studied.

EXAMPLE 4

The anti-aggressive activity of 5-methyl-s-triazolo-[3,4-a]-isoquinoline was determined using the following "isolated fighting mice" procedure.

The test animals were male mice which had been isolated in a cage for three weeks. The mice were aggressive and would attack within 5 minutes a non-isolated male mouse placed in its cage. After interaction of 5 minutes, the second mouse is removed. If no fighting occurred during this interval, the isolated mouse was considered to have been rendered non-aggressive. The ED$_{50}$ was obtained and is defined as that dose of the test compound which renders 50% of the animals tested non-aggressive. The ED$_{50}$ for 5-methyl-s-triazolo-[3,4-a]-isoquinoline was found to be approximately 12.8 mg./kg. for intraperitoneal injection.

In view of the above, it will be seen that the several objects of the invention are achieved and other advantageous results attained.

As various changes could be made in the above methods and compositions without departing from the scope of the invention, it is intended that all matter contained in the above description shall be interpreted as illustrative and not in a limiting sense.

What is claimed is:

1. A method of inhibiting aggressive behavior in a susceptible mammal which comprises administering to said mammal an effective amount of a compound selected from the group consisting of 8,9-dimethoxy-s-triazolo-[3,4-a]-isoquinoline,
3-methyl-8,9-dimethoxy-s-triazolo-[3,4-a]-isoquinoline,
3-ethyl-8,9-dimethoxy-s-triazolo[3,4-a]-isoquinoline,
3-isopropyl-8,9-dimethoxy-s-triazolo-[3,4-a]-isoquinoline,
3,5-dimethyl-s-triazolo-[3,4-a]-isoquinoline,
5-methyl-s-triazolo-[2,3-a]-isoquinoline,
3-(N-pyrrolidylmethyl)-s-triazolo-[3,4-a]-isoquinoline,
3-trifluoromethyl-6-chloro-s-triazolo-[3,4-a]-isoquinoline and
7-amino-s-triazolo-[3,4-a]-isoquinoline.

2. A method as set forth in claim 1 wherein said compound is 8,9-dimethoxy-s-triazolo-[3,4-a]-isoquinoline.

3. A method as set forth in claim 1 wherein said compound is 3-methyl-8,9-dimethoxy-s-triazolo-[3,4-a]-isoquinoline.

4. A method as set forth in claim 1 wherein said compound is 3-ethyl-8,9-dimethoxy-s-triazolo-[3,4-a]-isoquinoline.

5. A method as set forth in claim 1 wherein said compound is 3-(N-pyrrolidylmethyl)-s-triazolo-[3,4-a]-isoquinoline.

References Cited

UNITED STATES PATENTS 3,354,164  11/1967  Francis _____ 424—258

OTHER REFERENCES

Chem. Abst. 73–25363r (1970).

STANLEY T. FRIEDMAN, Primary Examiner